Oct. 4, 1966

A. W. LINDBERG ET AL 3,276,267

GYROSCOPIC APPARATUS

Filed Dec. 29, 1961

INVENTOR.
ALLAN W. LINDBERG
RAYMOND H. MARCUS
BY

*Alfred W. Petchaft*

ATTORNEY

Oct. 4, 1966  A. W. LINDBERG ET AL  3,276,267
GYROSCOPIC APPARATUS
Filed Dec. 29, 1961  6 Sheets-Sheet 2

INVENTOR.
ALLAN W. LINDBERG
RAYMOND H. MARCUS
BY
ATTORNEY

Oct. 4, 1966  A. W. LINDBERG ET AL  3,276,267
GYROSCOPIC APPARATUS
Filed Dec. 29, 1961  6 Sheets-Sheet 3

INVENTOR.
ALLAN W. LINDBERG
RAYMOND H. MARCUS
BY
ATTORNEY

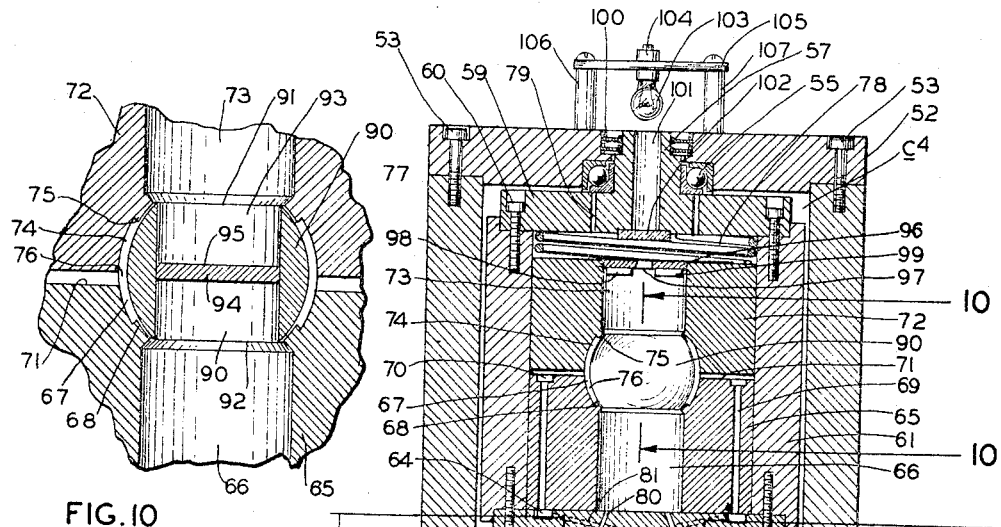

INVENTOR.
ALLAN W. LINDBERG
RAYMOND H. MARCUS
BY
Alfred W. Petchaft
ATTORNEY 3,276,267
GYROSCOPIC APPARATUS
Allan W. Lindberg, Kirkwood, and Raymond H. Marcus, Olivette, Mo., assignors to Universal Match Corporation, Ferguson, Mo., a corporation of Delaware
Filed Dec. 29, 1961, Ser. No. 163,159
18 Claims. (Cl. 74—5.7)

This invention relates in general to certain new and useful improvements in gyroscopic apparatus and, more particularly, to an extremely sensitive, highly accurate gyroscope having improved means for eliminating precessional error and aberrations resulting from mechanical forces in the bearing and the effect of acceleration forces or any unbalance in the system.

There is, at the present time, a very critical need for highly accurate and extremely reliable gyroscopic instruments which can be effectively used in missile guidance systems and in space navigation. In such applications or uses, it is obviously necessary to provide a stable and unvarying reference-device so that external information can be computed, evaluated or interpreted for such purposes as changing the course of a missile to correct for deviations induced by unpredicted atmospheric conditions or some similar purpose. In conventional and existing types of gyroscopic instruments, a sensitive element is caused to rotate in a relatively stationary case carried between gimbals. In such an environment, the residual torque acting on the gimbals all act directly to produce a drift. Moreover, factors such as thermal-flow in the ambient fluid surrounding the moving parts, take-off reactions, flex lead reactions, and mass shift due to motor and bearing heat, all operate cumulatively to produce such drift.

In conventional types of gyroscopic instruments, the measurement of displacement about the sensitive axis of the gyroscope is accomplished by an absolute angular measurement of the precession of the wheel about its gimbal axis. The ability of such device to detect an angular departure with precision is limited by the accuracy with which a signal generator can measure the magnitude of a departure relative to a fixed reference point. In addition to this, the accuracy of such measurement is dependent upon the precision of mechanical components, such as gimbal pivots, and the like.

Finally, presently available types of gyroscopic instruments which are used in providing a stable reference platform must employ a rotor which will maintain a long-time precise memory. Consequently, the rotor in such a device must not be affected by precessional forces inasmuch as such precessional forces would produce substantial error. Consequently, such gyroscopic devices ordinarily include very complicated arrangements to overcome the effect of precessional forces.

It is, therefore, the primary object of the present invention to provide an improved gyroscopic device which is capable of achieving an extremely high degree of accuracy.

It is another object of the present invention to provide a gyroscopic device of the type stated which is relatively simple in construction and, therefore, comparatively economical in cost.

It is an additional object of the present invention to provide a device of the type stated in which environmental causes of error, such as the velocities of relative motion and viscous forces acting upon the sensitive element, are reduced to a minimum.

It is likewise an object of the present invention to provide a gyroscopic device in which mass shifts and thermal-flow, due to heat generation in the driving motor and bearings, will have very little, if any, effect upon the sensitive elements within the gyroscope.

It is a further object of the present invention to provide a gyroscope instrument in which measurement of displacement about the sensitive axis of the gyroscope is predicated upon the determination of vibratory displacement between a secondary element and a primary element, thereby achieving a high degree of precision in making such measurement and, at the same time, accomplishing such result through comparatively simple instrumentation.

It is an additional object of the present invention to provide a gyroscopic instrument which is capable of establishing a stable reference platform in a relatively simple manner without the utilization of complicated devices for overcoming the effect of precessional forces.

With the above and other objects in view, our invention resides in the novel features of form, construction, arrangement, and combination of parts presently described and pointed out in the claims.

In the accompanying drawing (six sheets)—

FIG. 9 is a fragmentary sectional view taken along line 9—9 of FIG. 8;

Figure 18:
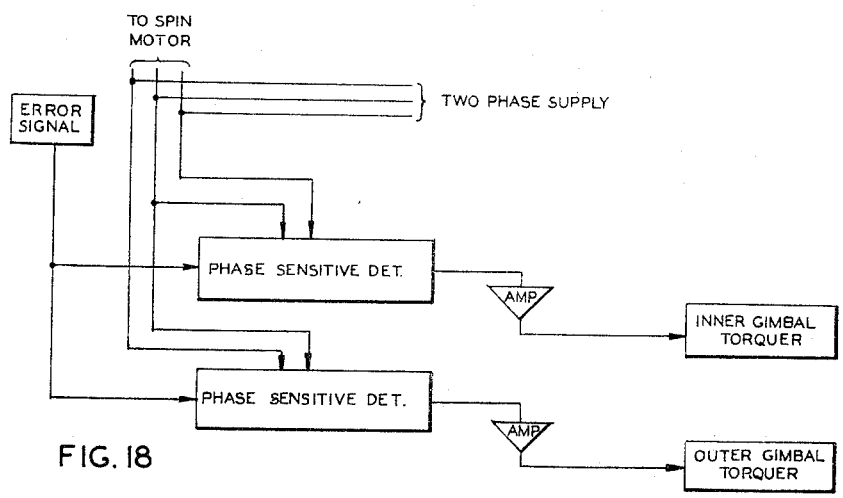
Figure 8:
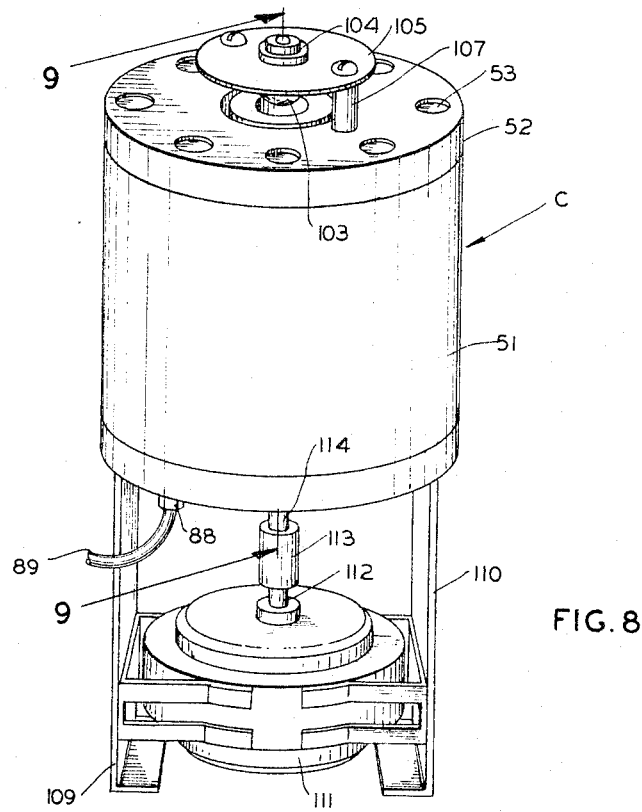
FIG. 8 is a perspective view of a modified form of gyroscope constructed in accordance with and embodying the present invention.
Figure 11:
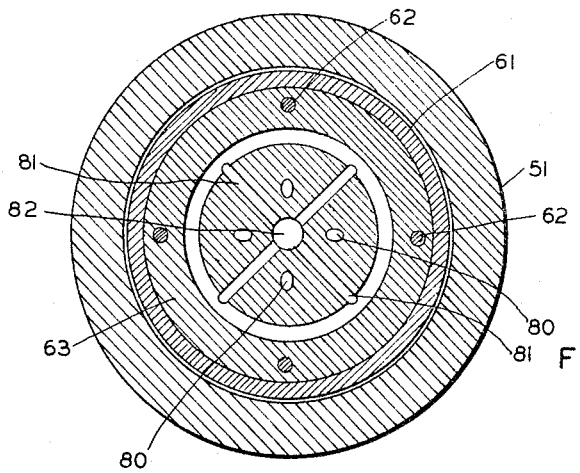
Figure 17:
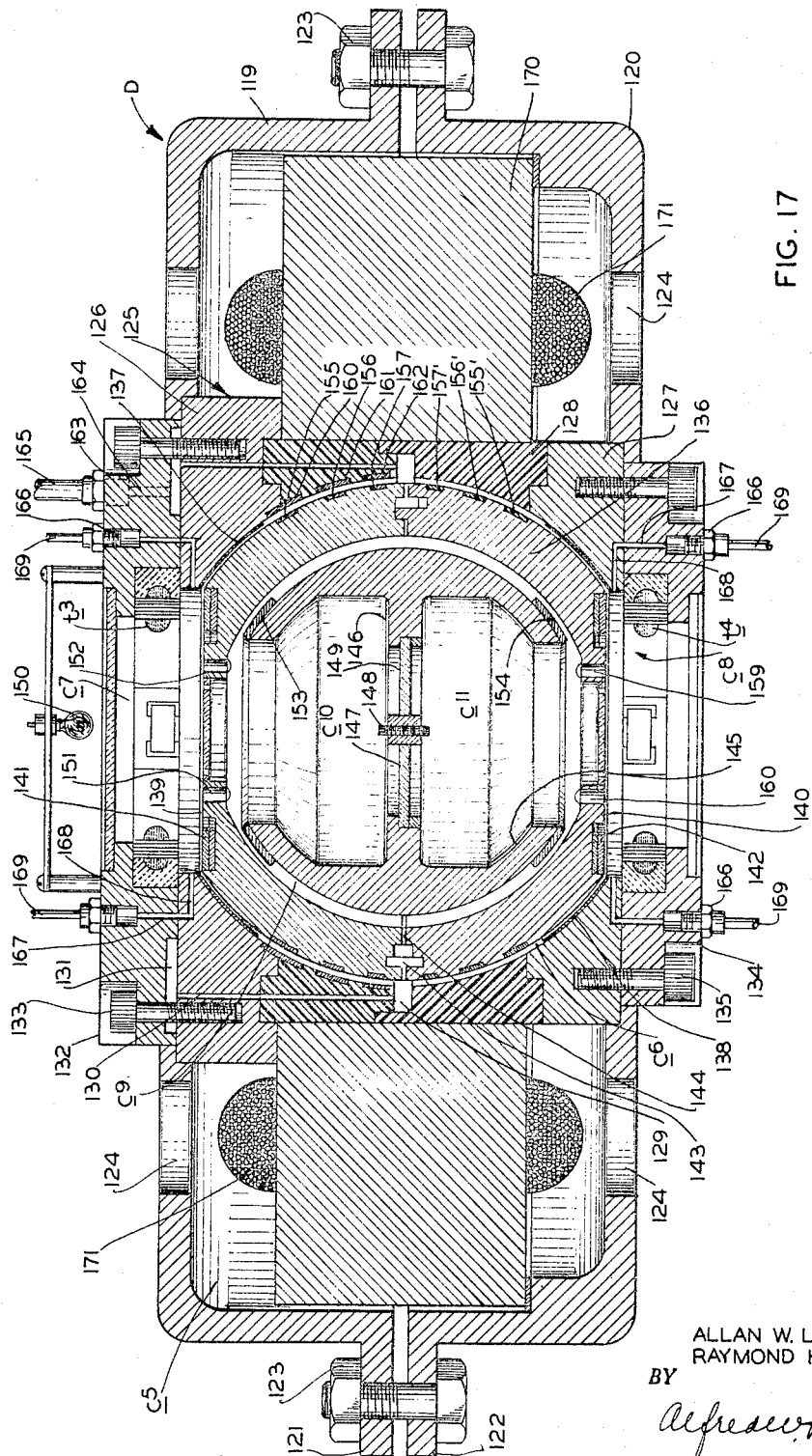

FIGS. 10 and 11 are fragmentary sectional views taken along lines 10—10 and 11—11, respectively, of FIG. 9;

FIG. 12, 13 14, and 15 are diagrammatic views illustrating the signal generating system of the gyroscope shown in FIG. 8;

FIG. 16 is a fragmentary sectional view showing a modified form of inner rotor forming a part of the present invention;

FIG. 17 is a vertical sectional view showing a modified form of gyroscopic instrument constructed in accordance with and embodying the present invention; and FIG. 18 is a block diagram which illustrates a servo-loop system employed in connection with the present invention.

Figure 1:
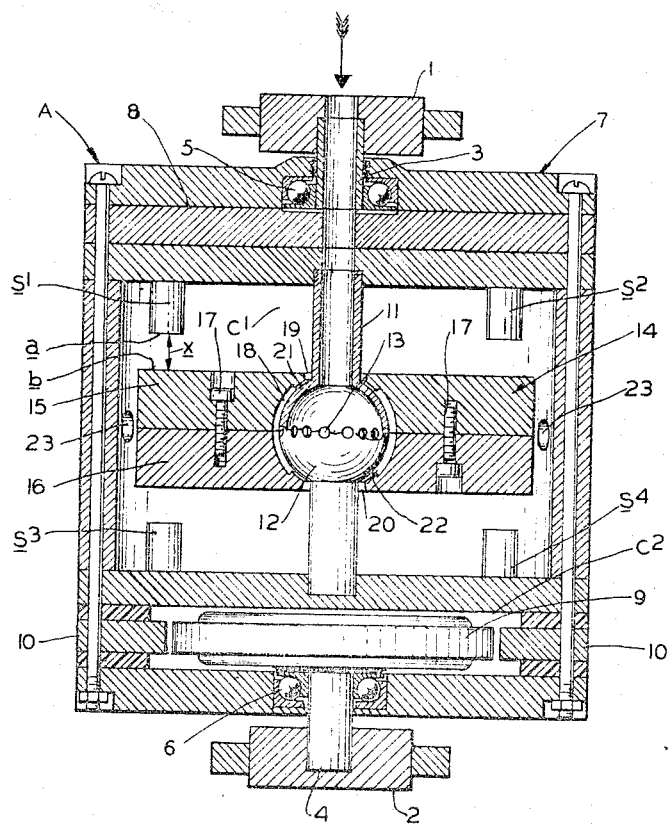
FIG. 1 is a diagrammatic sectional view of a gyroscopic system illustrating the basic principles embodied in and forming a part of the present invention.
Figures 2, 3:
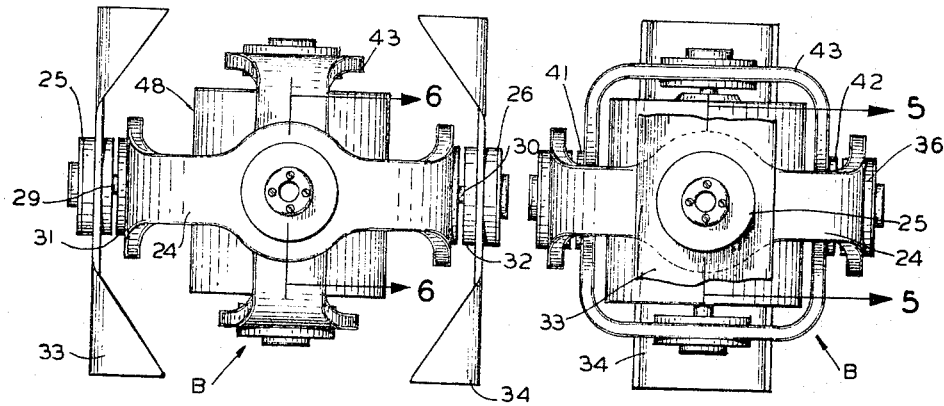
FIG. 2 is a front elevational view of a gyroscopic instrument constructed in accordance with and embodying the present invention.
FIG. 3 is a side elevational view of the gyroscopic instrument shown in FIG. 2.

Broadly speaking, the present invention resides in providing a gyroscope having a rotating main mass which is hollow and is provided internally with a secondary mass supported upon an anti-friction bearing such as a spherical gas-lubricated bearing. The broad principles of the present invention can best be illustrated by reference to FIG. 1 in which these various components are schematically illustrated. As shown in FIG. 1, the gyroscope A is suspended from an inner gimbal, elements of which are designated by reference numerals 1, 2, and are rigidly provided with coaxial tubes 3, 4, which, in turn, support radial-and-thrust bearings 5, 6, respectively. Operatively journaled upon the radial-and-thrust bearings 5, 6, is a hollow cylindrical outer rotor 7 which encloses an upper chamber $c^1$ and a lower chamber $c^2$, said chambers $c^1$, $c^2$, being coaxial and, therefore, being symmetrical about the longitudinal axis of the tubes 3, 4, which axis is ordinarily referred to in the gyroscopic art as the "spin axis." The upper tube 3 is provided with air or other gas under pressure supplied from a suitable type of conventional external gas pumping device (not shown), the gas flowing inwardly in the direction indicated by the arrow.

Rigidly mounted upon the interior end of the tube 4 and disposed within the lower chamber $c^2$ is a spin motor 9 which cooperates electromagnetically with pole-forming elements 10 to spin the main rotor 7 whenever the spin motor 9 is energized. For purposes of simplicity in this preliminary explanation, no effort has been made to illustrate or describe the electrical connections to or details of the spin motor 9 and the pole-forming elements 10. It is sufficient for present purposes to note that such devices are conventional and well understood by those skilled in the gyroscope art. Rigidly mounted in and extending coaxially through the chamber $c^1$ is a tubular shaft 11 which is integrally provided along its central portion with a spherical bearing shell 12 having a plurality of apertures 13. The tubular shaft 11 communicates at its upper end with the lower portion of the upper tube 3 so that when the main rotor 7 spins at high velocity, the gaseous medium supplied through the tube 3 will flow under pressure through the tubular shaft 11 and thence outwardly through the apertures 13.

Operatively mounted upon and around the spherical bearing shell 12 is an inner rotor 14 consisting of two cylindrical halves 15, 16, which are bolted together or held in assembled relationship by machine screws 17, the heads of the latter being suitably alternated for purposes of achieving dynamic balance. Internally, the inner rotor 14 is provided with a central substantially spherical recess 18 which opens at its upper and lower ends to apertures 19, 20, the latter being sized for closely encircling the adjacent portions of the tubular shaft 11 with sufficient clearance to avoid contact therewith. On its interior surface, the recess 18 is preferably, though not necessarily, provided with relatively narrow annular clearance rings 21, 22, the surfaces of which are somewhat closer to the surface of the spherical bearing shell 12 than the remaining surface of the recess 18 so as to act, in a limited sense, as restrictions against the outward flow of air or other gaseous medium. This arrangement may be referred to as a spherical pneumo-static stepped bearing. Schematically shown on the interior transverse walls of the chamber $c^1$ are symmetrically arranged signal generator elements $s^1, s^2, s^3, s^4$, electrically coupled through conventional external circuitry to generate a signal which is proportional to the distance $x$ between the proximate surface of the secondary rotor 14 and the signal element $s^1$, which is, in effect, the distance between the point $a$ on the signal generating element $s^1$ and the point $b$ on the secondary rotor 14, as will presently be more fully discussed. Finally, the side walls of the main rotor 7 are provided with a plurality of apertures 23 through which the air or other gaseous medium may escape in order to prevent pressure build-up within the chamber $c^2$.

Before the gaseous medium is admitted under pressure through the tube 3, the inner rotor 14 will rest upon or engage the spherical bearing shell 12 and, when the spin motor 9 is first energized, may be initially caused to rotate through frictional forces applied by such engagement. However, when the proper operating speed is attained, the inner rotor 14 will quickly assume the rotational speed of the outer rotor 7 for the reason that the entire environment of the inner rotor 14 will be rotating at operating speed. Moreover, during operation, as previously noted, air or other gaseous medium will flow continuously through the tube shaft 11 and outwardly through the apertures 13 of the spherical bearing shell 12 and through the recess 18. Thus, the inner rotor 14 will, in effect, float on the spherical cushion of air or other gaseous medium thus flowing through the recess 18. The gaseous medium, furthermore, flows through the recess from the apertures 13 to the clearance apertures 19, 20, with a swirling or spiral motion which contributes to the rotation of the inner rotor 14 through a force which may, by analogy, be termed as "Coriolis force." It has been found in connection with the present invention that the spherical gas bearing thus created will operate with a high degree of efficiency at gaseous pressures of the order of five p.s.i.

Under such circumstances, the inner rotor 14 will spin about its own independent spin-axis which is in approximately but not necessarily in exact alignment with the spin-axis of the outer rotor 7. Although ideally it would be desirable for the spin-axis of the inner rotor 14 to be completely independent of the outer rotor 7, there is an unavoidable coupling due to the viscosity of the gaseous medium. Consequently, it is essential to employ highly precise servo-loops which will substantially nullify the viscous coupling between the rotors 7, 14. Such a servo-loop system is well understood in the gyroscope art and is diagrammatically illustrated in FIG. 18.

In practical usage, it is desirable to place the original inertial angular positions of these spin-axes in some selected orientation to the external environment of the gyroscope. This can be accomplished by systematically manipulating the servo-loops through control signals externally demised so that the outer rotor 7 will, during initial start-up, continually be precessed with respect to such selected orientation and the viscous coupling between the rotors 7, 14, will have the net effect of bringing such spin-axes to co-incidence at such selected orientation.

In the course of ordinary operation, the outer rotor 7 will ultimately precess, by some small amount, from its original inertial angular position, but the inner rotor 14 will tend to remain fixed in its original angular position to a very high degree of precision. It should, of course, be noted that the relative position of the outer rotor 7 is continually being corrected in relation to the position of the inner rotor 14, to whatever extent necessary, by external servo-loops and suitable torquers, all of which are commonly used in connection with gyroscopic devices and will be well understood by those familiar with the art. Thus, the error which is represented by relative change in angular position between the outer rotor 7 and the inner rotor 14 will constantly be reduced to a very small value and, therefore, will never exceed the mechanical limitations of the device.

In the first place, the only mass unbalance which would tend to apply precessional torque to the inner rotor 14 will be a component of mass unbalance lying along the spin axis. However, because of the symmetrical configuration of the inner rotor 14 and because of the very minute amount of heat generated in the gas bearing, the amount of this unbalance can be held within very small limits. In the second place, the effect of stray gas bearing torque resulting from asymmetry within the bearing structure is eliminated by reason of the fact that the outer rotor 7 is in rotation. Moreover, since the gas bearing is spherical, the center of suspension generated by the gas pressure will tend to move up and down along the spin-axis by the same amount and in the same direction as the center of gravity of the inner rotor 14 whenever it tends to move up or down in response to acceleration and gravity forces acting along the spin-axis.

As a result of the directional stability of the inner rotor 14, when the outer rotor 7 precesses, it will move into a measurable angular relationship with respect to the inner rotor 14 and this angular relationship can be measured as a function of the length of the line $x$, which, of course, is an indication of the correction to be applied to the servo-loops to the outer rotor 7 to bring it back to alignment with the spin-axis of the inner rotor 14.

For instance, when the spin-axis of the inner rotor 14 is exactly coincident with the spin-axis of the outer rotor 7, the length of the line $x$ is constant. However, if a small angle of departure exists between the spin-axis of the inner rotor 14 and that of the outer rotor 7, the length of the line $x$ will vary sinusoidally in synchronism with the rotation of the instrument and the modulation in the length of the line $x$ defines the departure of the outer rotor 7 from the initial position of alignment with the inner rotor 14. It is important to note that the thing which is being measured is a modulation rather than an absolute length. Therefore, the accuracy of the measurement is much greater. If it be assumed that the signal generators $s^1$, $s^2$, $s^3$, $s^4$, are arranged so as to provide a signal which is proportional to the change in the length of the line $x$, the magnitude of such signal will be substantially proportional to the amount of the angular error present in the position of the outer rotor 7 and the phase angle of the signal will determine the direction of that error relative to the coordinate system of the inner gimbals 1, 2.

As previously stated, this signal, by the use of conventional electric circuitry, can be resolved into its rectilinear components and such components applied as signal to torque motors located at the gimbal bearings in such manner as to drive the error toward zero. It will, therefore, be evident that the angular position of the outer rotor 7 can be maintained in accurate alignment with the position of the inner rotor 14. The only torque required at the gimbal bearings is the amount necessary to counteract the maximum amount of precession torque which might be generated, on the average, by the gyroscope structure. The forces necessary to provide the instantaneous positioning of the gimbals are supplied by the momentum of the outer rotor 7.

The foregoing description outlines the arrangement and operation of the simplest form of the present invention. Gyroscopes of this type have extensive utility in various types of instrumentation requiring a highly stable inertial reference element. For many applications, however, it is necessary to provide a gyroscopic instrument such as the gyroscope B, shown in FIGS. 2 to 6, inclusive, which comprises a first or outer gimbal-ring 24 which is rockably mounted in opposing axially aligned cylindrical gimbal-blocks 25, 26. These gimbal-blocks 25, 26 are substantially conventional and the gimbal-block 25 is provided with a conventional torquer or torque-motor $m^1$ and electrical current transmission elements $t^1$ preferably of the slip-ring type. The gimbal-blocks are provided with ball-bearings 27, 28, for operatively supporting pintles 29, 30, which are rigidly fixed in inner gimbal-blocks 31, 32. The gimbal-blocks 25, 26, are, in turn, supported by bracket plates 33, 34, which are, in turn, conventionally mounted in any suitable environment depending upon the particular use and application of the gyroscopic instrument B. Since this external environment may be of any conventional type and is not, in and of itself, a part of the present invention, no illustration or description thereof is set forth herein.

Figures 4, 5:
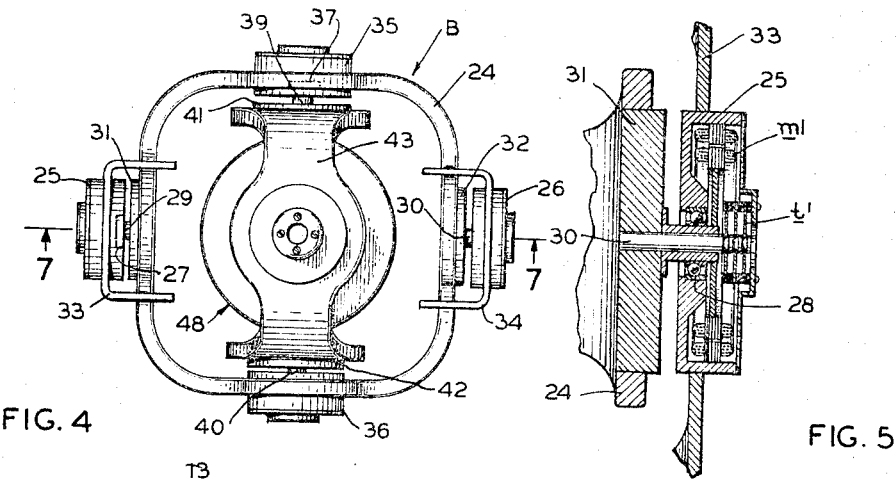
FIG. 4 is a top plan view of the gyroscopic instrument shown in FIG. 2.
FIG. 5 is a fragmentary sectional view taken along line 5—5 of FIG. 3.
Figure 6:
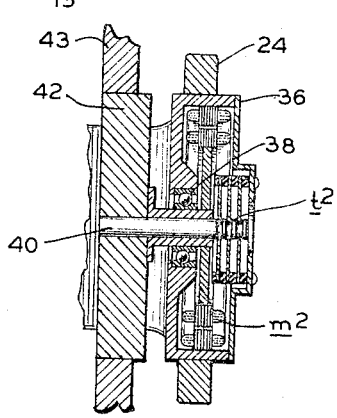
FIG. 6 is a fragmentary sectional view taken along line 6—6 of FIG. 2.
Figure 7:
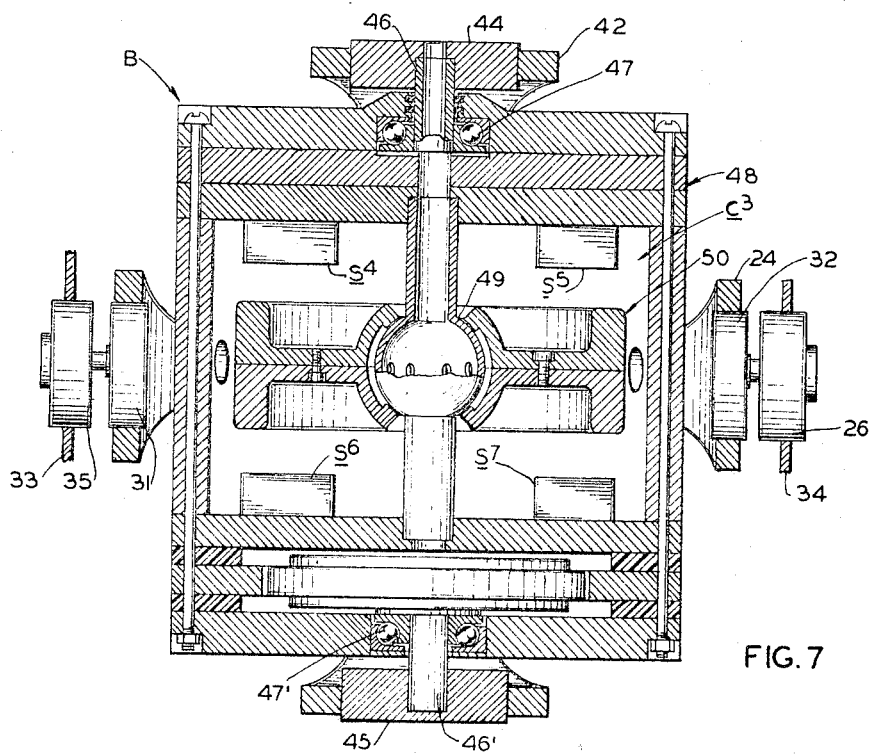
FIG. 7 is a fragmentary sectional view taken along line 7—7 of FIG. 4.

The outer gimbal-ring 24 is provided, along an axis at 180° to the axis of the gimbal-blocks 25, 26, with cylindrical gimbal-blocks 35, 36, having axially aligned ball-bearings 37, 38, for operatively supporting pintles 39, 40, which are rigidly fixed in inner gimbal-blocks 41, 42, rigidly mounted in and carried by a second gimbal-ring 43. Thus, the gimbal-ring 43 is swively mounted within the outer gimbal-ring 24, substantially as shown in FIG. 4. The gimbal-block 42 is provided with a conventional torquer or torque-motor $m^2$ and electrical current transmission elements $t^2$ preferably of the slip-ring type. The torque-motors $m^1$, $m^2$, when suitably energized, will apply position-corrective torque to the gimbal-rings 24 and 43.

The second or inner gimbal-ring 43 is provided along an axis at 180° to the axis of the gimbal-blocks 41, 42, with auxiliary bearing-blocks 44, 45, which are similar in shape and size to the gimbal-blocks 41, 42. Rigidly mounted in the gimbal-block 44 coincident with the spin-axis of the gyroscopic instrument B, are two tubes 46, 46', which are substantially similar to the previously described tubes 3, 4, and support radial-and-thrust bearings 47, 47', upon which an outer rotor 48 is operatively supported.

The outer rotor 48 is similar, both in structure and function, to the previously described outer rotor 7 and is provided with a spherical gas bearing 49, which is substantially similar to the previously described spherical gas bearing 12. Operatively supported upon the gas bearing 49 is an inner rotor 50 which is similar to the previously described inner rotor 14 and is operatively housed within the interior hollow chamber $c^3$ of the outer rotor 48. Moreover, within the chamber $c^3$, the outer rotor 48 is provided with signal-generating elements $s^4$, $s^5$, $s^6$, $s^7$, which may be of any type conventionally used in gyroscopic devices and are electrically connected through elements $t^1$ and $t^2$ to conventional electronic circuitry capable of resolving the signals from the signal generating elements $s^4$, $s^5$, $s^6$, $s^7$, both as to magnitude and phase angle. This electronic circuitry, which is schematically shown in FIG. 18, is of conventional type and, in and of itself, forms no part of the present invention. It is, therefore, not specifically shown or described herein, it being sufficient for present purposes merely to point out that the resolved impulses generated therein will be transmitted to the torque-motors $m^1$, $m^2$, in order to apply position-correcting impulses to the gimbal-rings 24, 43, and thereby compensate for any error, aberration, drift or precessional torque which may tend to produce angular departure between the spin-axes of the outer rotor 48 and the inner rotor 50. It should be noted, however, that the reference voltages supplied to the phase sensitive detectors must be respectively in phase and 90° out of phase with the rotation of a selected reference point on the outer rotor. This can be accomplished, for example, by using a two-phase synchronizer spin motor, in which case the two-phase supply to such spin motor will have one voltage exactly in phase and one voltage exactly 90° out of phase with such rotating reference point. It is also possible to apply a two-phase reference generator to the same shaft as the shaft which supports the outer rotor and obtain the necessary reference voltages.

It is also possible to provide another modified form of gyroscopic instrument C, shown in FIGS. 8 to 11, inclusive, which is provided with an optical transducer-system. The gyroscope C comprises a cylindrical cage 51 and circular plate or cover 52, which are carefully machined on their meeting faces and are secured together by a plurality of bolts 53, thereby forming an outer chamber $c^4$. Integrally, the cage 51 is precisely machined to form an internal spin-chamber 54 which is of true circular cross-sectional shape in all planes parallel to the meeting faces of the cage 51 and cover 52.

At its opposite ends, the cage 51 is provided with radial and thrust bearings 55, 56, which are precisely coaxial with the spin-axis of the gyroscopic instrument C and operatively support tubular pintles or quills 57, 58. At one end, the quill 57 opens onto the external face of the cover 52 and, at its other end, the quill 57 is diametrally enlarged to form a circular end-plate 59 connected by means of screws 60 to one end of a cylindrical outer rotor 61. At one end, the outer rotor 61 is similarly connected by means of screws 62 to a circular end-plate 63 which is integrally formed with one end of the lower quill 58 and is substantially similar to the end-plate 59 except that it is provided upon its forwardly presented face with an annular channel 64. Seated snugly within the outer rotor 61 upon the upwardly presented face of the end-plate 63 is a cylindrical ring 65 which is internally provided with a cylindrical bore 66 coaxial with the spin rotor of the gyroscopic instrument C, the latter opening at its inner end to a hemispherical recess 67 which is separated from the proximate end of the bore 66 by a narrow annular step bearing 68. The ring 65 is also provided with a plurality of gas ducts 69 which are preferably parallel to the spin-axis and communicate at their distal ends with the channel 64 and, at their other ends, open into a similar annular channel 70 formed on the flat face 71 of the ring 65. Slidably seated within the outer rotor 61 is a secondary ring which normally rests flatwise upon the face 71 of the ring 65 and is internally provided with a cylindrical bore 73 which is of the same diameter as, and is coaxial with, the bore 66. At its inner end, the bore 73 is provided with a downwardly flaring hemispherical recess 74 which matches the hemispherical recess 67 and is separated from the cylindrical bore 73 by means of a narrow annular step bearing 75. As will be seen by reference to FIG. 9, the matching hemispherical recesses 67 and 74, taken together, form a frusto-spherical recess or chamber 76 which is substantially similar in shape and function to the recess 18 of the previously described gyroscope A, except that the gaseous medium is supplied through an annular channel or slit which extends around the equator of the chamber 76.

The secondary ring 72 is somewhat shorter in vertical height than the distance between the upper face 71 of the ring 65 and the under or interior face of the end-plate 59 so that there is a substantial amount of space between the face 77 of the secondary ring 72 and the interior face of the end-plate 59. In this latter space is a rather large diameter, relatively weak, compression spring 78 which normally biases the secondary ring 72 into engagement with the ring 65.

The end-plates 59, 63, are respectively provided with a series of somewhat axial vent-ducts 79, 80, which respectively establish communication between the bores 73 and 69 to the chamber $c^4$. Similarly, the end-plate 63 is also provided with a plurality of oblique gas-transmission ducts 81 which open at their outer ends to the chamber 64 and at their inner ends to the axial bore 82 of the quill 58. This quill 58 extends operatively through a series of outwardly spaced rotary sealing rings 83, which serve to isolate an annular channel 84 formed in the cage 51 and communicating to the interior of the bore 82 by means of a series of radial ducts 85 bored through the quill 58. Moreover, the duct 85 opens to a lateral duct 86 which communicates, through a duct 87, to a coupling 88, which is, in turn, connected by means of a conduit 89 to a suitable source of gaseous medium under pressure (not shown). When air or other gaseous medium is admitted under pressure from such source by means of a conventional valve (also not shown) to the conduit 89, such gas medium will flow through the various channels above described and enter the channel 70 exerting pressure upon the secondary ring 72, forcing it away from the ring 65 against the bias of the spring 78, for purposes presently more fully appearing.

Disposed within the recess 76 is an inner rotor 90 having frusto-spherical shape, that is to say, the shape of a double truncated sphere, with upper and lower circular margins 91, 92, which, respectively, lie in spaced parallel planes. The rotor 90 is centrally provided with a cylindrical bore 93 which is also normally coaxial with the spin-axis of the gyroscopic instrument C and is rigidly provided, midway of its axial length, with a transverse wall 94, the upper surface 95 of which is polished or silvered to provide a light-reflective surface.

Rigidly mounted in one end of the bore 73 and extending transversely thereacross is a support disk 96 having a central aperture 97 mounted upon the interior face of the support disk 96 and carried thereby is a pair of diametrically opposed photocells 98, 99, which are electrically connected by conventional lead wires (not shown) to conventional slip ring assemblies 100 operatively mounted between the upper end of the quill 57 and the cover plate 52. The bore 101 of the quill 57 is sealed with a transparent plate 102 and opens directly to suitably uniform and constant light source 103 mounted in a suitable socket 104 carried by a plate 105 supported upon studs 106, 107, mounted upon the outer face of the cover 52.

Secured upon the other face of the cage 51 by means of bolts 108 and outwardly extending brackets 109, 110, is a conventional spin motor 111 having a shaft 112 which is coaxial with the spin-axis of the gyroscopic instrument C and is operatively connected by means of a tubular bushing 113 to a stub shaft 114 which is, in turn, rigidly connected in the quill 58, terminating outwardly from the duct 85 so as to avoid interference with the flow of gas through the bore 82 into the channel 64 and thence through the channel 70.

When the spin motor 111 is energized and thus set into rotation, the outer rotor 61 will, of course, be spun and, since the ring 72 is biased into engagement with the ring 65, the step bearings 68, 75, will, in effect, cage the inner rotor 90. This is true because the inner rotor 90 is of such diameter that it will be lightly engaged by the step bearings 68, 75, when the ring 72 is in endwise contact upon the ring 65. As soon as the outer rotor 61 begins to attain appropriate rotational speed, a gaseous medium is admitted and, as above pointed out, the pressure exerted by the gaseous medium is sufficient to push the secondary ring 72 away from the ring 65 creating a space therebetween through which the gaseous medium can enter the chamber or recess 76 thereby constituting it as a gaseous bearing of the type previously described. As the secondary ring 72 is thus shifted away from the ring 65, the inner rotor 90 will become uncaged, so to speak, and will function as a reference-medium in the same manner as the inner rotor of the previously described gyroscope A.

A shaft of light from the light source 103 will travel axially downwardly through the bore 101, the transparent plate 102, and the aperture 97 so as to impinge, as incident light, upon the reflective surface 95. As long as the axes of rotation of the inner rotor 90 and outer rotor 61 are precisely coincident, the reflected light from the reflective surface will travel back up along a line substantially coincident with the spin-axis of the gyroscopic instrument C. If, however, there is a relative tilting or deflection between the axes of rotation of the inner rotor 90 and outer rotor 61, a greater or lesser amount of reflected light will impinge upon the photocells 98, 99, as shown scematically in the pairs of views, FIGS. 12–13 and FIGS. 14–15. Moreover, as the inner rotor 90 and the outer rotor 61 rotate, the beam of reflected light will alternate between the photocell 98 to the photocell 99, so as to produce a periodically varying output signal. Again, this signal will be transmitted to conventional external circuitry similar to the circuitry discussed above in connection with the gyroscopic instrument B, to apply corrective forces to the entire gyroscopic instrument C by any suitable conventional means (not shown).

If desired, a modified form of inner rotor 90' may be provided as shown in FIG. 16. This inner rotor 90' is substantially similar to the rotor 90 except that it is provided with a central cylindrical bore 93' which is closed at its upper end by an integral wall 115 having a polished or mirrored reflective surface 116. Rigidly mounted in the lower end of the bore 93' is a fixed partition or wall 117 which threadedly supports a vertically adjustable screw 118. This screw 118 can be threaded upwardly or downwardly as desired to facilitate balancing of the rotor 90'. Because it is possible to balance the rotor 90', it is not necessary that the rotor 90' be machined or otherwise fabricated to quite as close a tolerance as the previously described rotor 90.

It is also possible to provide a further modified form of gyroscopic instrument D, as shown in FIG. 17, which comprises two matching pot-shaped housing elements 119, 120, which are respectively provided with annular flanges 121, 122, and are secured together by a plurality of peripheral clamping bolts 123, thereby forming a chamber $c^5$ which is vented to the ambient through a series of vent-holes 124. Rigidly mounted between the housing elements 119, 120, and extending centrally through the chamber $c^5$ is a gyroscope-case generally designated by the reference numeral 125 and consisting of an upper circular plate 126, a lower circular plate 127, and an intermediate substantially cylindrical case-forming element 128. The plates 126, 127, are preferably made of metal and the case-forming element 128 is preferably made of sintered iron, all three being internally machined or otherwise fabricated to provide a substantially frustospherical chamber $c^6$ which opens at its upper and lower ends into somewhat cylindrical coaxial chambers $c^7$, $c^8$, which respectively house conventional torquers $t^3$, $t^4$. The chamber $c^6$ is provided around its central plane or "equator" with an annular gas-supply duct 129 which comes through a series of vertical ducts 130 to an annular channel 131 formed in the under face of a top plate 132 tightly secured upon the upper face of the plate 126 by means of screws 133. Similarly secured upon the under face of the plate 127 is a bottom plate 134 which is secured in place by means of screws 135. As will be seen by reference to FIG. 17, the top plate 132 is centrally milled out or otherwise formed to provide the top portion of the chamber $c^7$ and, similarly, the bottom plate 134 is centrally milled out or formed to provide the lower portion of the chamber $c^8$. Finally, it will be noted that the torquers $t^3$, $t^4$, are mechanically held in place by, and potted into the plates 132, 134, respectively. Rotatably mounted within the chamber $c^6$ is a hollow spherical outer rotor 136 which is of such external diametral size as to have proper facewise clearace with respect to inwardly projecting annular step bearings 137, 138. At its upper and lower ends, the outer rotor 136 is machined off to provide flat parallel top and bottom recessed faces 139, 140, and rigidly seated thereon are soft iron armature rings 141, 142, which cooperate respectively with the torquers $t^3$, $t^4$.

The outer rotor 136 is, furthermore, machined around its central plane or so-called "equator" to provide an annular gas-supply duct 143 which communicates with the chamber $c^6$ and the gaseous medium being supplied thereto through the duct 129. This duct 143 communicates through radial passages 144 with a spherical interior chamber $c^9$ within the interior of the outer rotor 136.

Rotatably disposed within the chamber $c^9$ is a spherical or ball-shaped inner rotor 145 having upper and lower internal chambers $c^{10}$, $c^{11}$, which are separated by a centrally apertured partition 146, the latter being rigidly provided with a transverse closure disk 147 centrally provided with a balancing screw 148. The outer surface of the inner rotor 145 is substantially smaller in diametral size than the interior diametral size of the outer rotor 136 and is provided with a reflective element 149 which is substantially similar in construction and function to the previously described mirrored surface 95, and cooperates optically with the light source 150. Similarly, the outer rotor 136 is provided with photo voltaic cells 151, 152, which are similar in function to the previously described photocells 98, 99.

Adjacent its truncated or planar ends, the inner rotor 145 is provided with upper and lower annular stepped bearings 153, 154. It should be noted, in this connection, that the clearance spaces between the external faces of the stepped bearings 137, 138, 153, 154, are designed and carefully machined so as to provide the proper amount of clearance to maintain adequate power pressure of gaseous medium within the bearing spaces so that the outer rotor 136 will be supported for relatively friction-free rotation within the case-forming element 128 and the inner rotor 145 will be supported within the chamber $c^9$ free of mechanical contact with the outer rotor 136.

Recessed into the outer face of the outer rotor 136 above the equator thereof are three axially spaced annular rings 155, 156, 157, which are made of some very thin suitably electrically conductive material and are electrically isolated by some conventional insulated means from each other and from the outer rotor 136. For convenience, the intermediate ring 156 serves as the common conductor and is connected by an insulated wire to the common terminals of the photo voltaic cells 151, 152. The other terminals of the photo voltaic cells 151, 152, are respectively connected by separate insulated conductors to the rings 155, 157. Because of the scale of the drawings, and in the interest of clarity of illustration, these insulated conductors are not shown but the function and arrangement thereof are entirely conventional and will be well understood by those familiar with the art. Although precise perfection in symmetry and balance is not entirely essential, so far as the outer rotor 136 is concerned, it is, nevertheless, desirable. Therefore, it is preferable to provide the outer rotor 136 with three matching dummy rings 155', 156', 157', which are respectively mounted below the equator of the rotor 136 in more or less symmetrical arrangement with respect to the electrically conductive rings 155, 156, 157. These dummy rings 155', 156', 157', perform no electrical function but should match the rings 155, 156, 157, in size, weight, and location. For the same reason, the lower portion of the outer rotor 136 is provided with dummy slugs 158, 159, which have no electrical function but, for purposes of balance and symmetry, match the photo voltaic cells 151, 152, in weight, size, and location.

Finally, the interior surface of the case-forming element 128, that is to say, the interior surface of the chamber $c^6$, is provided with three axially spaced annular rings 160, 161, 162, which are also made of very thin electrically conductive material and are isolated, by means of conventional insulated material, from each other and from the case-forming element 128. These rings 160, 161, and 162, are also connected by suitable insulated electrical conductors of wire (not shown) to external electrical control circuitry which forms servo-loops. It should be noted, in this connection, that the respective pairs of rings 155–160, 156–161, and 157–162, are capacitatively coupled so that the signals generated by the photo voltaic cells 151, 152, will be continuously transmitted through such capacitative coupling to the external servo-loops. Moreover, the outer-rings 160, 161, 162, are each wider in the axial direction than the corresponding rings 155, 156, 157, so that the degree of capacitative coupling will not be varied or affected by angular shifting of the position of the inner rotor 136 with respect to the case-forming element 128.

The plate 132 is provided with a first nipple 163 which communicates through a duct 164 to the channel 131 and is connected by means of a conduit 165 to a conventional gas supply system (not shown). The plates 132, 134, are also provided with outlet nipples 166 which communicate through ducts 167 to lateral manifold-passages 168, which in turn, open into the chambers $c^7$, $c^8$ respectively. At their outer ends the nipples 166 are side of the gas supply system so that a suitable gaseous medium under pressure may be circulated through the chambers $c^6$, $c^9$. It will, of course, be understood that if the gaseous medium is merely compressed air, the conduits 169 can be exhausted to atmosphere. On the other hand, if the gaseous medium, for any reason, should be some other gas, such as nitrogen, helium, or xenon, it would be desirable to provide a recirculating system for such gas.

Rigidly mounted on the exterior of and surrounding the cage-forming element 128 is a spin motor stator 170 which is provided with spin motor coils 171. These coils are connected by conventional means (not shown) to a suitable source of electrical current and, when energized, will cause the outer rotor 136 to spin. Inasmuch as the inner rotor 145 is environmentally disposed within the outer rotor 136, it will also begin to spin and gradually reach substantially the same speed. It will, of course, be understood that the gaseous medium admitted under pressure through the conduit 165 will, in effect, form spherical gas bearings within the chambers $c^6$, $c^9$, so that the outer rotor 136 and the inner rotor 145 are effectively supported upon gaseous bearings as previously discussed.

The above-mentioned conventional electronic circuitry will function to apply appropriate corrective signals to the torquers $t^3$, $t^4$. As long as the spin axes of the inner rotor 145 and the outer rotor 136 are coincident, no error signal will be generated by the photo voltaic cells 151, 152, but as soon as there is an angular deviation between these axes, a corresponding error signal will be generated which can be demodulated and resolved through the electronic circuit and applied as a corrective impulse upon the torquers $t^3$, $t^4$.

It is, of course, well understood in the gyroscopic art that the rotational speed of an inertial mass should be as high as possible, but it has been found that gyroscopes constructed in accordance with this present invention are fully operative and extremely precise at spin speeds as low as three thousand to four thousand r.p.m., although, as a matter of preference, it is considered desirable to drive the outer rotor at forty thousand r.p.m. It has also been found that the radial distance between the spaced spherical surfaces constituting the stepped portion of the gas bearing should be of the order of .0005 inch, and the radial distance between the spaced spherical surfaces in the internal area of the gas bearing should be of the order of .001 inch. These clearances are primarily applicable to the inner rotors in all of the above-described embodiments. In the case of the gyroscope D having dual frusto-spherical rotors, it has been found that the clearances between the outer rotor and the case-forming element can be substantially greater. In fact, in the embodiment of the gyroscope D illustrated and described herein, the latter clearances were .001 inches across the stepped portion of the bearing and .002 across the interior regions of the bearing. While the above-described clearance-dimensions are not highly critical, they, nevertheless, will be significant designed parameters.

It should be understood that changes and modifications in the form, construction, arrangement, and combination of the several parts of the gyroscopic apparatus may be made and substituted for those herein shown and described without departing from the nature and principle of our invention.

Having thus described my invention, what I claim and desire to secure by Letters Patent is:

1. A gyroscopic instrument having bearing support means, a first rotor mounted within the bearing support means for rotation about a selected spin-axis, said first rotor having an internal chamber, driving means for causing the first rotor to spin about said spin-axis, a second rotor operatively disposed within said chamber, caging means carried by the first rotor and being releasably engaged with the second rotor whereby to cause the second rotor to spin at the same time as the first rotor spins, and means for releasing the engagement between the aging means and the second rotor whereby the second rotor becomes free to spin about a spin-axis which is independent of the spin-axis of the first rotor so as to afford a stable reference means for determining positional errors in the spin-axis of the first rotor as such errors occur.

2. A gyroscopic instrument having bearing support means, a first rotor mounted within the bearing support means for rotation about a selected spin-axis, said first rotor having an internal chamber, driving means for causing the first rotor to spin about said spin-axis, a second rotor operatively disposed within said chamber, caging means carried by the first rotor and being releasably engaged with the second rotor whereby to cause the second rotor to spin at the same time as the first rotor spins, means for releasing the engagement between the caging means and the second rotor whereby the second rotor becomes free to spin about a spin-axis which is independent of the spin-axis of the first rotor so as to afford a stable reference means for determining deviations from parallelism between the spin-axis of the first rotor and the spin-axis of the second rotor as such deviations occur, and means for sensing such deviations.

3. A gyroscopic instrument having bearing support means, a first rotor mounted within the bearing support means for rotation about a selected spin-axis, said first rotor having an internal chamber, driving means for causing the first rotor to spin about said spin-axis, a second rotor operatively disposed within said chamber, caging means carried by the first rotor and being releasably engaged with the second rotor whereby to cause the second rotor to spin at the same time as the first rotor spins, and pneumatic means for releasing the engagement between the caging means and the second rotor whereby the second rotor becomes free to spin about a spin-axis which is independent of the spin-axis of the first rotor so as to afford a stable reference means for determining positional errors in the spin-axis of the first rotor as such errors occur.

4. A gyroscopic instrument having bearing support means, a first rotor mounted within the bearing support means for rotation about a selected spin-axis, said first rotor having an internal chamber, driving means for causing the first rotor to spin about said spin-axis, a second rotor operatively disposed within said chamber, caging means carried by the first rotor and being releasably engaged with the second rotor whereby to cause the second rotor to spin at the same time as the first rotor spins, said caging means including a spring-biased clamping element, and means for releasing the engagement between the caging means and the second rotor whereby the second rotor becomes free to spin about a spin-axis which is independent of the spin-axis of the first rotor so as to afford a stable reference means for determining positional errors in the spin-axis of the first rotor as such errors occur.

5. A gyroscopic instrument having a cage, bearing means mounted at spaced positions in the cage along an axial line whereby to establish a selected spin axis, a first rotor operatively journaled in and supported by the bearing means for rotation about said selected spin-axis, said first rotor having an internal chamber having a frusto-spherical surface, driving means for causing the first rotor to spin about said spin-axis, a second rotor operatively disposed within said chamber and having an independent spin-axis, the second rotor being of frusto-spherical shape and being diametrally smaller in size than said chamber so that there is space between the second rotor and the interior surface of the chamber, said second rotor being adapted to spin at the same time as the first rotor spins, a source of fluid under pressure located externally of the cage, first passage-forming means extending through the cage and opening into said space at a selected region for conducting said fluid under pressure to said space, second passage-forming means extending outwardly from said space and through the first rotor for discharging fluid externally thereof, said second passage-forming means also communicating with said space at a selected region which is remote with respect to the first-mentioned selected region so as to maintain a flowing film of fluid under pressure within said space whereby said second rotor is supported wholly and entirely within said chamber upon the flowing film of fluid can spin about said independent spin-axis and thereby afford a stable reference axis for determining positional errors in the spin-axis of the first rotor with respect to said reference axis as such errors occur, and light reflective means for generating a signal responsive to positional errors when they occur.

6. A gyroscopic instrument having a cage, bearing means mounted at spaced positions in the cage along an axial line whereby to establish a selected spin axis, a first rotor operatively journaled in and supported by the bearing means for rotation about said selected spin-axis, said first rotor having an internal chamber having a frusto-spherical surface, driving means for causing the first rotor to spin about said spin-axis, a second rotor operatively disposed within said chamber and having an independent spin-axis, the second rotor being of frusto-spherical shape and being diametrally smaller in size than said chamber so that there is space between the second rotor and the interior surface of the chamber, said second rotor being adapted to spin at the same time as the first rotor spins, a source of fluid under pressure located externally of the cage, first passage-forming means extending through the cage and opening into said space at a selected region for conducting said fluid under pressure to said space, second passage-forming means extending outwardly from said space and through the first rotor for discharging fluid externally thereof, said second passage-forming means also communicating with said space at a selected region which is remote with respect to the first-mentioned selected region so as to maintain a flowing film of fluid under pressure within said space whereby said second rotor is supported wholly and entirely within said chamber upon the flowing film of fluid in free relation to the first rotor so that the second rotor can spin about said independent spin-axis and thereby afford a stable reference axis for determining positional errors in the spin-axis of the first rotor with respect to said reference axis as such errors occur, and light reflective means for generating a signal responsive to positional errors when they occur.

7. A gyroscopic instrument having a cage, bearing means mounted at spaced positions in the cage along an axial line whereby to establish a selected spin axis, a first rotor operatively journaled in and supported by the bearing means for rotation about said selected spin-axis, said first rotor having an internal chamber having a frusto-spherical surface, driving means for causing the first rotor to spin about said spin-axis, a second rotor operatively disposed within said chamber and having an independent spin-axis, the second rotor being of frusto-spherical shape and being diametrally smaller in size than said chamber so that there is space between the second rotor and the interior surface of the chamber, said second rotor being adapted to spin at the same time as the first rotor spins, a source of fluid under pressure located externally of the cage, first passage-forming means extending through the cage and opening into said space at a selected region for conducting said fluid under pressure to said space, second passage-forming means extending outwardly from said space and through the first rotor for discharging fluid externally thereof, said second passage-forming means also communicating with said space at a selected region which is remote with respect to the first-mentioned selected region so as to maintain a flowing film of fluid under pressure within said space whereby said second rotor is supported wholly and entirely within said chamber upon the flowing film of fluid in free relation to the first rotor so that the second rotor can spin about said independent spin-axis and thereby afford a stable reference axis for determining positional errors in the spin-axis of the first rotor with respect to said reference axis as such errors occur, light reflective means for generating a signal responsive to positional errors when they occur, and means for correcting said errors responsive to such signals.

8. A gyroscopic instrument comprising a housing having a frusto-spherical chamber, a first frusto-spherical rotor mounted within the housing and being smaller than the chamber so that there is space between the inner surface of the chamber and the outer surface of the first rotor, means for rotating the first rotor about a selected spin-axis, said first rotor having an internal frusto-spherical chamber, and a frusto-spherical second rotor operatively disposed within the chamber of the first rotor and adapted to spin at the same time as the first rotor spins, a source of fluid under pressure located externally of the housing, first passage-forming means extending through the housing and opening into said space at a selected region for conducting said fluid under pressure to such space, second passage-forming means extending outwardly from said space and through the housing for discharging fluid externally thereof, said second passage-forming means also communicating with said space at a selected region which is remote with respect to the first-mentioned selected region so as to maintain a flowing film of fluid under pressure within said space whereby said first rotor is supported wholly and entirely within said housing chamber upon the flowing film of fluid, said second rotor being free to spin about a spin-axis which is independent of the spin-axis of the first rotor so as to afford a stable reference means for determining positional errors in the spin-axis of the first rotor as such errors occur.

9. A gyroscopic instrument comprising a housing having a frusto-spherical chamber, a first frusto-spherical rotor mounted within the housing and being smaller than the chamber so that there is space between the inner surface of the chamber and the outer surface of the first rotor, means for rotating the first rotor about a selected spin-axis, said first rotor having an internal frusto-spherical chamber, a frusto-spherical second rotor operatively disposed within the chamber of the first rotor and adapted to spin at the same time as the first rotor spins, a source of fluid under pressure located externally of the housing, first passage-forming means extending through the housing and opening into said space at a selected region for conducting said fluid under pressure to such space, second passage-forming means extending outwardly from said space and through the housing for discharging fluid externally thereof, said second passage-forming means also communicating with said space at a selected region which is remote with respect to the first-mentioned selected region so as to maintain a flowing film of fluid under pressure within said space whereby said first rotor is supported wholly and entirely within said housing chamber upon the flowing film of fluid, said second rotor being free to spin about a spin-axis which is independent of the spin-axis of the first rotor so as to afford a stable reference means for determining positional errors in the spin-axis of the first rotor as such errors occur, and means for generating a signal responsive to a positional error.

10. A gyroscopic instrument comprising a housing having a frusto-spherical chamber, a first frusto-spherical rotor mounted within the housing and being smaller than the chamber so that there is space between the inner surface of the chamber and the outer surface of the first rotor, means for rotating the first rotor about a selected spin-axis, said first rotor having an internal frusto-spherical chamber, a frusto-spherical second rotor operatively disposed within the chamber of the first rotor and adapted to spin at the same time as the first rotor spins, a source of fluid under pressure located externally of the housing, first passage-forming means extending through the housing and opening into said space at a selected region for conducting said fluid under pressure to such space, second passage-forming means extending outwardly from said space and through the housing for discharging fluid externally thereof, said second passage-forming means also communicating with said space at a selected region which is remote with respect to the first-mentioned selected region so as to maintain a flowing film of fluid under pressure within said space whereby said first rotor is supported wholly and entirely within said housing chamber upon the flowing film of fluid, said second rotor being free to spin about a spin-axis which is independent of the spin-axis of the first rotor so as to afford a stable reference means for determining positional errors in the spin-axis of the first rotor as such errors occur, means for generating a signal responsive to a positional error, and torquer means for correcting the error in the first rotor responsive to said signal.

11. A gyroscopic instrument comprising a housing having a frusto-spherical chamber, a first frusto-spherical rotor mounted within the housing and being smaller than the chamber so that there is space between the inner surface of the chamber and the outer surface of the first rotor, a spin motor operatively mounted in the housing in concentric relation about the chamber for rotating the first rotor about a selected spin-axis, said first rotor having an internal frusto-spherical chamber, and a frusto-spherical second rotor operatively disposed within the chamber of the first rotor and adapted to spin at the same time as the first rotor spins, a source of fluid under pressure located externally of the housing, first passage-forming means extending through the housing and opening into said space at a selected region for conducting said fluid under pressure to such space, second passage-forming means extending outwardly from said space and through the housing for discharging fluid externally thereof, said second passage-forming means also communicating with said space at a selected region which is remote with respect to the first-mentioned selected region so as to maintain a flowing film of fluid under pressure within said space whereby said first rotor is supported wholly and entirely within said housing chamber upon the flowing film of fluid, said second rotor being free to spin about a spin-axis which is independent of the spin-axis of the first rotor so as to afford a stable reference means for determining positional errors in the spin-axis of the first rotor as such errors occur.

12. A gyroscopic instrument comprising a housing having a frusto-spherical chamber, a first frusto-spherical rotor mounted within the housing and being smaller than the chamber so that there is a first space between the inner surface of the chamber and the outer surface of the first rotor, means for rotating the first rotor about a selected spin-axis, said first rotor having an internal frusto-spherical chamber, a frusto-spherical second rotor operatively disposed within the chamber of the first rotor and being smaller than the chamber in the first rotor so that there is a second space between the inner surfaces of the last named chamber and the outer surface of the second rotor, a source of fluid under pressure located externally of the housing, first passage-forming means extending through the housing and opening into the first space at a first selected region for conducting said fluid under pressure to such first space, second passage-forming means extending inwardly from such first space into the second space for conducting said fluid under pressure to such second space at a second selected region, third passage-forming means extending outwardly from the second space and through the first rotor and housing for discharging fluid externally thereof, said third passage-forming means also communicating with said second space at a third selected region which is remote with respect to the second selected region so as to maintain a flowing film of fluid under pressure within said first and second spaces, whereby said first rotor is supported entirely within said housing chamber upon the flowing film of fluid and said second rotor is supported wholly and entirely within the chamber in the first rotor upon the flowing film of fluid, said second rotor being adapted to spin at the same time as the first rotor spins, said second rotor being free to spin about a spin-axis which is independent of the spin-axis of the first rotor so as to afford a stable reference means for determining positional errors in the spin-axis of the first rotor as such errors occur, and means for generating a signal responsive to a positional error.

13. A gyroscopic instrument having a cage, bearing means mounted at spaced positions in the cage along an axial line whereby to establish a selected spin axis, an outer rotor journaled in and supported by the bearing means for rotation about said selected spin-axis, said rotor having an internal chamber provided with a surface of spherical conformation, driving means for causing the rotor to spin about said spin-axis, and an inner rotor operatively disposed within said chamber and adapted to spin at the same time as the outer rotor spins, said inner rotor having a surface geometrically similar to, but smaller than, said surface of the chamber so that there will be space of spherical contour between the inner rotor and the internal walls of the chamber, a source of fluid under pressure located externally of the cage, first passage-forming means extending through the cage and the first rotor and opening into said space at a selected region for conducting said fluid under pressure to such space, second passage-forming means extending outwardly from said space and through the first rotor and cage for discharging fluid externally thereof, said second passage-forming means also communicating with said space at a selected region which is remote with respect to the first mentioned selected region so as to maintain a flowing film of fluid under pressure within said space, said film supporting said second rotor wholly and entirely within said first rotor so that the inner rotor is free to spin about a spin-axis which is independent of the spin-axis of the outer rotor thereby providing a stable reference means for generating a signal which is a function of the relative motion between the inner and outer rotors as a result of deviations in parallelism between the spin-axes of said inner and outer rotors.

14. A gyroscopic instrument having a cage, bearing means mounted at spaced positions in the cage along an axial line whereby to establish a selected spin axis, a first rotor operatively journaled in and supported by the bearing means for rotation about said selected spin-axis, said first rotor having an internal chamber having a frusto-spherical surface, driving means for causing the first rotor to spin about said spin-axis, a second rotor operatively disposed within said chamber and having an independent spin-axis, the second rotor being of frusto-spherical shape and being diametrally smaller in size than said chamber so that there is space between the second rotor and the interior surface of the chamber, said second rotor being adapted to spin at the same time as the first rotor spins, and a source of fluid under pressure located externally of the cage, first passage-forming means extending through the cage and the first rotor and opening into said space at a selected region for conducting said fluid under pressure to such space, second passage-forming means extending outwardly from said space and through the first rotor and cage for discharging fluid externally thereof, said second passage-forming means also communicating with said space at a selected region which is remote with respect to the first mentioned selected region so as to maintain a flowing film of fluid under pressure within said space, said film supporting said second rotor wholly and entirely within said first rotor whereby to support said second rotor in free relation to the first rotor so that the second rotor can spin about said independent spin-axis and thereby afford a stable reference means for generating a signal which is a function of the relative motion occurring between said first and second rotors as a result of deviations in parallelism between the spin-axes of said first and second rotors.

15. A gyroscopic instrument comprising a housing having a frusto-spherical chamber, a first frusto-spherical rotor mounted within the housing and being smaller than the chamber so that there is a first space between the inner surface of the chamber and the outer surface of the first rotor, means for rotating the first rotor about a selected spin-axis, said first rotor having an internal frusto-spherical chamber, a frusto-spherical second rotor operatively disposed within the chamber of the first rotor and being smaller than the chamber in the first rotor so that there is a second space between the inner surfaces of the last named chamber and the outer surface of the second rotor, a source of fluid under pressure located externally of the housing, first passage-forming means extending through the housing and opening into the first space at a first selected region for conducting said fluid under pressure to such first space, second passage-forming means extending inwardly from such first space into the second space for conducting said fluid under pressure to such second space at a second selected region, third passage-forming means extending outwardly from the second space and through the first rotor and housing for discharging fluid externally thereof, said third passage-forming means also communicating with said second space at a third selected region which is remote with respect to the second selected region so as to maintain a flowing film of fluid under pressure within said first and second spaces, whereby said first rotor is supported entirely within said housing chamber upon the flowing film of fluid and said second rotor is supported wholly and entirely within the chamber in the first rotor upon the flowing film of fluid, said second rotor being adapted to spin at the same time as the first rotor spins, said second rotor being free to spin about a spin-axis which is independent of the spin-axis of the first rotor so as to afford a stable reference means for generating a signal which is a function of the relative motion occurring between said first and second rotors as a result of deviations in parallelism between the spin-axes of said first and second rotors, means for generating a signal responsive to a positional error, and means for correcting the error in the first rotor responsive to said signal.

16. A gyroscopic instrument comprising a first gyroscopic rotor, means mounting said first rotor for rotation about a spin axis with a plurality of degrees of freedom for said spin axis, means for driving said first rotor to spin it about its said spin axis, said first rotor having a chamber therewithin, a second rotor in said chamber within the first rotor, said rotors having surface portions facing one another and said rotors being so dimensioned as to enable said second rotor to float in said chamber free of said first rotor with said surface portions spaced one from the other and with the second rotor spinning on a spin axis independent of the spin axis of the first rotor to provide a stable reference for the first rotor, said first rotor being passaged for flow of a fluid from a source of fluid under pressure to the space between said surface portions for floating the second rotor on the fluid in the space between said surface portions.

17. A gyroscopic instrument as set forth in claim 16 wherein the first rotor has a tubular shaft extending axially of the first rotor within its said chamber, said shaft having an enlarged bearing portion, said second rotor loosely surrounding said bearing portion, said shaft constituting a passage for said fluid, and said enlarged bearing portion of the shaft being apertured for exit of fluid therefrom to the space between said bearing portion and the second rotor.

18. A gyroscopic instrument as set forth in claim 16 wherein said surface portions of the rotors are constituted by an internal surface portion of the first rotor within said chamber and an external surface portion of said second rotor.

References Cited by the Examiner
UNITED STATES PATENTS

| | | | |
|---|---|---|---|
| 1,603,352 | 10/1926 | Paxton | 74—5.37 |
| 2,534,824 | 12/1950 | Jones | 74—5.6 |
| 2,719,291 | 9/1955 | Wing | 74—5 X |
| 2,729,106 | 1/1956 | Mathiesen | 74—5 X |
| 2,852,943 | 9/1958 | Sedgfield | 74—5.7 |
| 2,949,780 | 8/1960 | Williams | 74—5.34 X |

FRED C. MATTERN, JR., *Primary Examiner.*

BROUGHTON G. DURHAM, *Examiner.*

K. DOOD, P. W. SULLIVAN, *Assistant Examiners.*